United States Patent
Döhler et al.

(10) Patent No.: US 10,821,670 B2
(45) Date of Patent: Nov. 3, 2020

(54) METHOD FOR ADDITIVE MANUFACTURING OF A THREE-DIMENSIONAL OBJECT

(71) Applicant: CL SCHUTZRECHTSVERWALTUNGS GMBH, Lichtenfels (DE)

(72) Inventors: Tim Döhler, Großheirath (DE); Peter Pontiller-Schymura, Neudrossenfeld (DE); Alexandra Popp, Bad Staffelstein (DE)

(73) Assignee: Concept Laser GmbH, Lichtenfels (DE)

( * ) Notice: Subject to any disclaimer, the term of this patent is extended or adjusted under 35 U.S.C. 154(b) by 202 days.

(21) Appl. No.: 15/812,963

(22) Filed: Nov. 14, 2017

(65) Prior Publication Data
US 2018/0141276 A1 May 24, 2018

(30) Foreign Application Priority Data
Nov. 21, 2016 (DE) .......................... 10 2016 122 368

(51) Int. Cl.
*B29C 64/20* (2017.01)
*B29C 64/268* (2017.01)
(Continued)

(52) U.S. Cl.
CPC .......... *B29C 64/268* (2017.08); *B29C 64/153* (2017.08); *B29C 64/295* (2017.08);
(Continued)

(58) Field of Classification Search
CPC ... B29C 64/268; B29C 64/153; B29C 64/264; B29C 64/273; B29C 64/277;
(Continued)

(56) References Cited

U.S. PATENT DOCUMENTS

| | | | |
|---|---|---|---|
| 5,393,482 A * | 2/1995 | Benda | B29C 64/153 419/1 |
| 5,508,489 A | 4/1996 | Benda et al. | |

(Continued)

FOREIGN PATENT DOCUMENTS

| | | |
|---|---|---|
| DE | 102013205029 A1 | 9/2014 |
| DE | 102013011675 A1 | 1/2015 |

(Continued)

OTHER PUBLICATIONS

European Search Report Corresponding to Application No. 17179843 dated Feb. 6, 2018.
(Continued)

*Primary Examiner* — Joseph S Del Sole
*Assistant Examiner* — Jamel M Nelson
(74) *Attorney, Agent, or Firm* — Dority & Manning, P.A.

(57) ABSTRACT

A method for additive manufacturing of a three-dimensional object (6) by successive, selective layer-by-layer solidification of layers of a construction material (9) by at least one energy beam, wherein the successive, selective solidification of the construction material (9) is carried out due to a data record describing the three-dimensional object to be additively manufactured (6), wherein construction material sections provided for sintering and/or melting on or melting through are heated in a temperature range lying below the solidification temperature of the construction material (9), wherein the heating of the construction material section(s) is carried out by at least one heating beam (17) either surrounding at least one main beam (18) provided for melting on or melting through in sections or going ahead or following the main beam (18), wherein the main beam (18) and the heating beam (17) are together guided synchronously along the surface of the construction material (9).

20 Claims, 3 Drawing Sheets

(51) Int. Cl.
- *B33Y 40/00* (2020.01)
- *B29C 64/295* (2017.01)
- *B33Y 10/00* (2015.01)
- *B33Y 30/00* (2015.01)
- *B29C 64/153* (2017.01)
- *B22F 3/105* (2006.01)

(52) U.S. Cl.
CPC ............... *B33Y 10/00* (2014.12); *B33Y 30/00* (2014.12); *B33Y 40/00* (2014.12); *B22F 3/1055* (2013.01); *B22F 2003/1056* (2013.01); *Y02P 10/25* (2015.11)

(58) Field of Classification Search
CPC ... B29C 64/282; B29C 64/286; B29C 64/343; B29C 64/295; B33Y 10/00; B33Y 30/00; B22F 3/1055; B22F 2003/1056
See application file for complete search history.

(56) References Cited

U.S. PATENT DOCUMENTS

| | | |
|---|---|---|
| 5,640,667 A | 6/1997 | Freitag et al. |
| 2009/0283501 A1 | 11/2009 | Erikson et al. |
| 2012/0237745 A1 | 9/2012 | Dierkes et al. |
| 2013/0064706 A1 | 3/2013 | Schwarze et al. |
| 2016/0250717 A1 | 9/2016 | Kruger et al. |
| 2016/0288254 A1 | 10/2016 | Pettit et al. |
| 2017/0008126 A1 | 1/2017 | Long et al. |
| 2017/0021455 A1* | 1/2017 | Dallarosa .............. B29C 64/268 |
| 2017/0087670 A1* | 3/2017 | Kalentics ............. B23K 26/342 |
| 2018/0134027 A1* | 5/2018 | O'Neill ................... G01F 11/18 |

FOREIGN PATENT DOCUMENTS

| | | |
|---|---|---|
| EP | 0863806 A1 | 9/1998 |
| JP | H09504055 A | 4/1997 |
| JP | 2000/517375 A | 12/2000 |
| JP | 2013/501701 A | 1/2013 |
| WO | 2015120168 A1 | 8/2015 |

OTHER PUBLICATIONS

European Search Opinion Corresponding to Application No. 17179843.2 dated Feb. 28, 2018.
Machine Translated Japanese Office Action Corresponding to Application No. 2017212959 dated Sep. 19, 2018.
German Search Results Corresponding to Application No. 102016122368.9 dated Jan. 9, 2019.
Chinese Office Action Corresponding to Application No. 201710768587.4 dated May 24, 2019.
Machine Translated Japanese Office Action Corresponding to Application No. 2017212959 dated Aug. 7, 2019.

* cited by examiner

METHOD FOR ADDITIVE MANUFACTURING OF A THREE-DIMENSIONAL OBJECT

CROSS-REFERENCE TO RELATED APPLICATIONS

This application claims priority to German Patent Application serial no. 10 2016 122 368.9 filed Nov. 21, 2016, the contents of which is incorporated herein by reference in its entirety as if set forth verbatim.

The invention, at first, relates to a method for additive manufacturing of an object comprising the further features of the preamble of claim 1. In addition, the invention relates to an apparatus comprising the features of claim 14.

The technical field of so-called 3D printing methods, especially the field of selective laser melting (SLM) or selective laser sintering (SLS), is especially addressed. The invention also includes so-called stereolithography methods and associated apparatuses, in which liquid or paste-like construction material is also transferred into a solidified state as the result of the impact of radiation energy, in order to manufacture three-dimensional objects out of it in a layer-by-layer manner.

In all these methods, construction material layers are applied to a surface or a workpiece area already solidified, or are created in a construction module by lowering a holding device with parts already solidified. These layers are solidified in a process-controlled manner by a focused beam of a suitable beam source hitting at the positions of the construction material layer to be solidified, thus solidifying, i.e. especially presintering or sintering on, melting on or melting through, those positions of the construction material layer. For this purpose, a data record is provided describing the object to be additively manufactured.

All methods are based on the finding that by a certain energy input, especially in SLM or SLS methods, the construction material is brought beyond a solidification point, especially a melting point. A forming melting pool that not only forms within the construction material layer to be solidified but reaches to at least one construction material layer lying below results in the fact that the construction material solidifies, wherein in SLM methods the powder-type structure is dissolved. In SLS methods, the powder particles of the construction material can at least in part be maintained.

It is already known as prior art to pre-warm or preheat the construction material.

This happens either by separately heating the construction material above the construction plate, alternatively by heating the construction material through the chamber wall of the construction chamber, or by heating the construction material above the surface thereof, wherein in all these methods the entire construction material arranged in the construction chamber is pre-heated. In addition, it has already been known to pre-warm the construction material only locally and to pay attention to not exceed the melting point thereof. A local warming up of the construction material can be carried out by the construction laser, wherein predetermined positions of a workpiece layer are each irradiated multiple times. In a first irradiation the construction material is at first brought to a temperature below the melting temperature; in a subsequent irradiation process, to a temperature above the melting temperature (EP 1 568 472 B1). Such an approach requires a complex guiding of the laser beam above the construction material layers to be solidified; e.g., the beam needs to carry out meandering movements directed forwards and backwards. Thus, the control of the construction process can be complicated, and the construction process can be delayed.

The invention is based on the object of designing a method comprising the features of the preamble of claim 1 such that it can be performed more simply and quickly. An apparatus for performing the method should also be simplified.

Said object is solved by the features of the independent patent claims 1 and 14. Advantageous further developments of the invention result from the dependent claims.

The core of the invention is considered to be the fact that the heating beam, responsible for heating or preheating, consequently for preheating or heating up the construction material (below the solidification temperature thereof), surrounds the main beam, responsible for melting on or sintering the construction material, or is directly going ahead or following the main beam related to the solidification track, i.e. especially melting or sintering track, wherein it is guided synchronously across the surface together with the main beam.

Regarding the method, this has the great advantage that, at first, construction material sections which, at first, are not intended for solidification are not preheated and thus the construction material in said sections can be used for further construction processes unaffected by any heat effect.

Thermally induced (mechanical) tensions in the component are avoided due to reduced temperature gradients, as are tensions in the component due to thermal expansions.

The dimensional accuracy of the component is increased. Shrinkage in the solid-liquid-transition of the melting bath is avoided, because the surrounding of the melting bath has already a raised temperature. Overall, tensions are reduced. Gas pores can be avoided by drying the powders; embrittlement of the component by reducing cooling rates is achieved as well as a change of the component by thermal shock.

Since the construction material is only preheated where solidification is carried out in direct surrounding, material stress is reduced by reducing the thermal circulation.

As far as the apparatus is concerned, the apparatus is designed simply, especially the control of the scanner elements, particularly the scanner mirrors. Both beams, having separate tasks or functions, can simultaneously be guided over one and the same scanner mirror. Subsequently guiding the main and the heating beams, especially regarding control, in a complex manner is not necessary for the method.

The heating beam can be generated in different ways. On the one hand, extracting the heating beam from the main beam is possible; this can happen by a beam splitter; the extracted beam is typically guided through expansion optics such that the heating beam has a larger beam diameter than the main beam. The beams can again be brought together by a beam coupling device, a beam coupler in short, and enter into, e.g., a scanner following the beam coupler, directing both beams simultaneously and possibly rectified to the component surface.

However, it is also possible to use different beam sources for generating main and heating beams. These can also have different wavelength ranges, if this is purposeful for the heating or melting-on of the construction material.

The beams can be guided to the construction material lying coaxially, i.e., the heating beam has a (widely) circular cross-section; the main beam, typically also with a (widely) circular cross-section, is (essentially) guided in the center of the main beam. However, it is also possible to, e.g., have the heating beam hit the construction material surface in elliptical shape, and to arrange the main beam in the section of the ellipse further ahead or back, so that, e.g., the impact of the heating beam prior to solidification of the construction material is carried out a little longer and more intensively. It is also possible to have the main beam and the heating beam hit the construction material surface far away from each other, i.e. spatially separate, at a narrow remove from each other.

It is possible to change the decentralization or focus shape of the main and heating beams in a process-controlled manner. However, the heating beam is to be shaped and guided in relation to the main beam such that only the direct surroundings of the main beam or a section in which the heating beam is going ahead or following the main beam is heated. The ratio of the beam splitting as well as the spot size of the two beams hitting the construction material surface (main beam and heating beam) can also be varied in a process-controlled manner.

To generate the heating structure hitting the construction material surface, an apparatus needs to have at least one beam source and at least one beam coupler bringing together both beams (main beam and heating beam) such that they can fall onto the construction material surface together arranged inside each other or at an adjustable remove.

For this purpose, a scanner does not necessarily need to be used; it is also possible to control this beam structure arranged inside each other or on each other by moving an optic above the construction material surface, or to specifically turn on and off a plurality of beam sources.

The invention is explained in more detail by means of exemplary embodiments in the figures of the drawings. In which.

Figure 1:
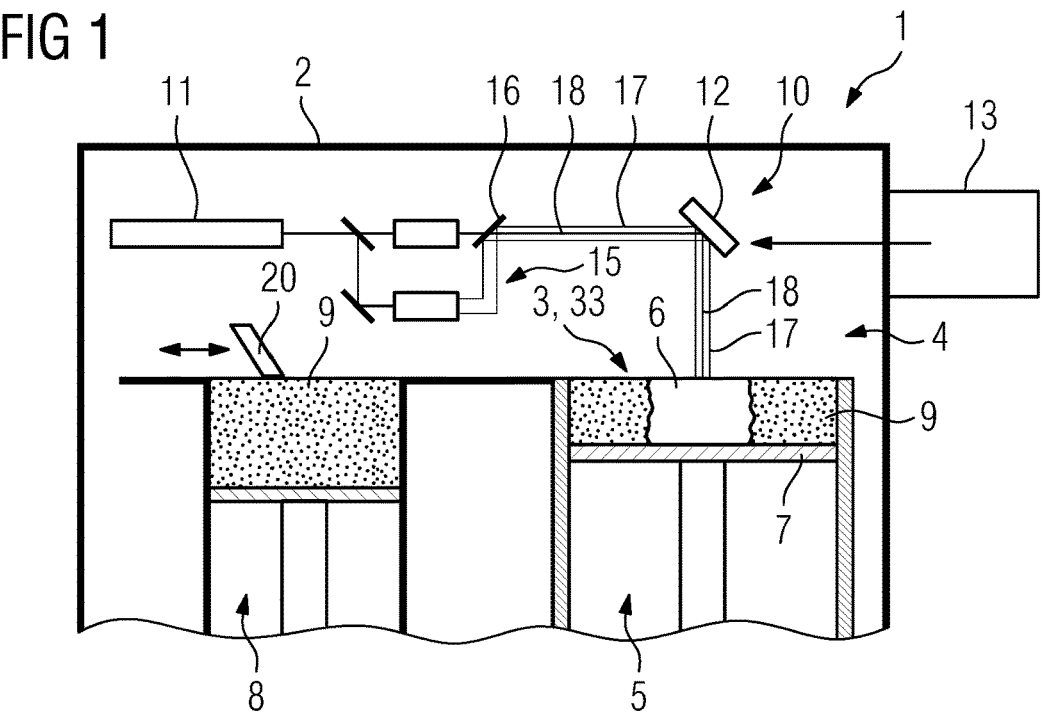
FIG. 1 is a schematic diagram of an apparatus for performing the method in a first embodiment.

At first, reference is made to FIG. 1 of the drawings.

The apparatus 1 shown in FIG. 1 of the drawings has a housing 2 that is graphically only implied, in which a construction room 3 and a process chamber 4 are set up. In the construction room 3 a carrying device 5 for carrying an object to be manufactured 6 is arranged. The carrying device 5 has a height-adjustable carrier 7. Next to the construction room 3, a metering device 8 is arranged, from which construction material 9 can be applied layer by layer onto the carrying device 5 or a layer previously formed, e.g. by means of a horizontally movable application device 20.

In or above the process chamber 4, an irradiation device 10 is provided serving for irradiating the layers of the construction material 9. In the exemplary embodiment, the irradiation device 10 comprises a laser 11 and a scanner 12, wherein the mirrors of the scanner 12 are controlled by a process control device 13 that is only indicated, based on a data record describing the three-dimensional object to be additively manufactured 6.

In the housing 2, a device 15 for section-wise heating, especially preheating or post-heating, of sections of a construction material layer is further provided.

In the exemplary embodiment shown in FIG. 1, the device 15 comprises at least one beam coupling device 16, with which a heating beam 17 provided for heating the material surface sections can be brought together with a main beam 18 effecting a sintering or melting process of the construction material such that both beams can be guided together and synchronously over surface sections to be heated or to be solidified of the construction material layer, wherein the focus of the main beam 18 is guided either within the diameter of the heating beam 17 or abutting against or directly adjacent to the diameter of the heating beam 18.

Figure 1A:
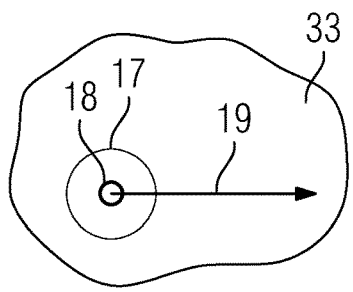
FIG. 1a is a schematic diagram of the impact sections of the main beam and the heating beam in an arrangement inside each other.
Figure 1B:
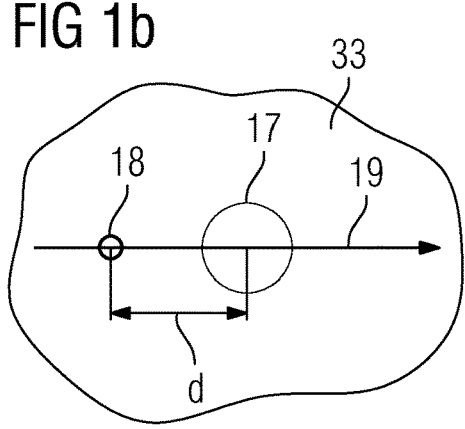
FIG. 1b is a schematic diagram of the impact sections of the main beam and the heating beam, wherein the heating beam is arranged going ahead the main beam.

In FIG. 1a, an arrangement of the main beam 18 and the heating beam 17 is shown, wherein the point where the main beam 18 hits the surface of the construction material layer is arranged centrally in the impact diameter of the heating beam 17. In contrast, FIG. 1b shows a spaced arrangement of the main and heating beams 18, 17, wherein the impact point of the heating beam 17 is arranged with little distance to the impact point of the main beam 18 and is going ahead the main beam 18 in track direction 19.

Figure 2:
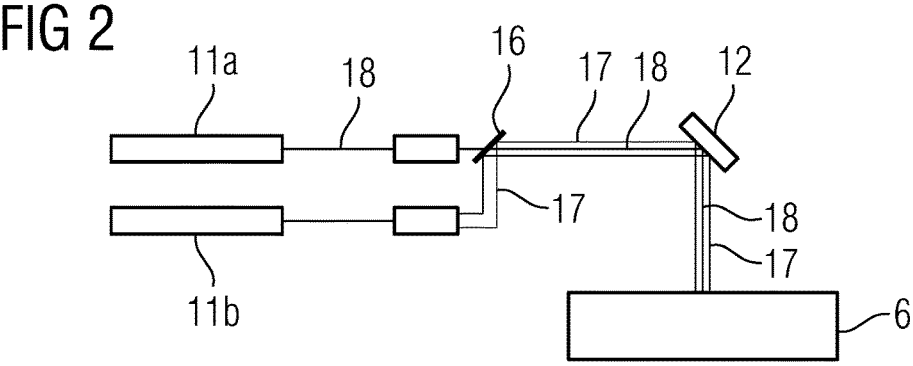
FIG. 2 is a schematic diagram of an apparatus for performing the method, comprising two beam sources.

In FIG. 2, essentially only the elements of the irradiation device 10 and the device 15 for heating are shown. In contrast to the exemplary embodiment shown in FIG. 1, the apparatus 1 according to FIG. 2 comprises two beam sources, namely a first laser 11a and a second laser 11b, wherein the first laser 11a generates the main beam 18 and the second laser 11b is provided for generating the heating beam 17. Both beams 17 and 18 are united via a beam coupling device 16, beam coupler in short, and are in turn delivered to the scanner 12, where they are guided to the component surface synchronously and arranged inside each other or closely adjacent to each other.

Figure 3:
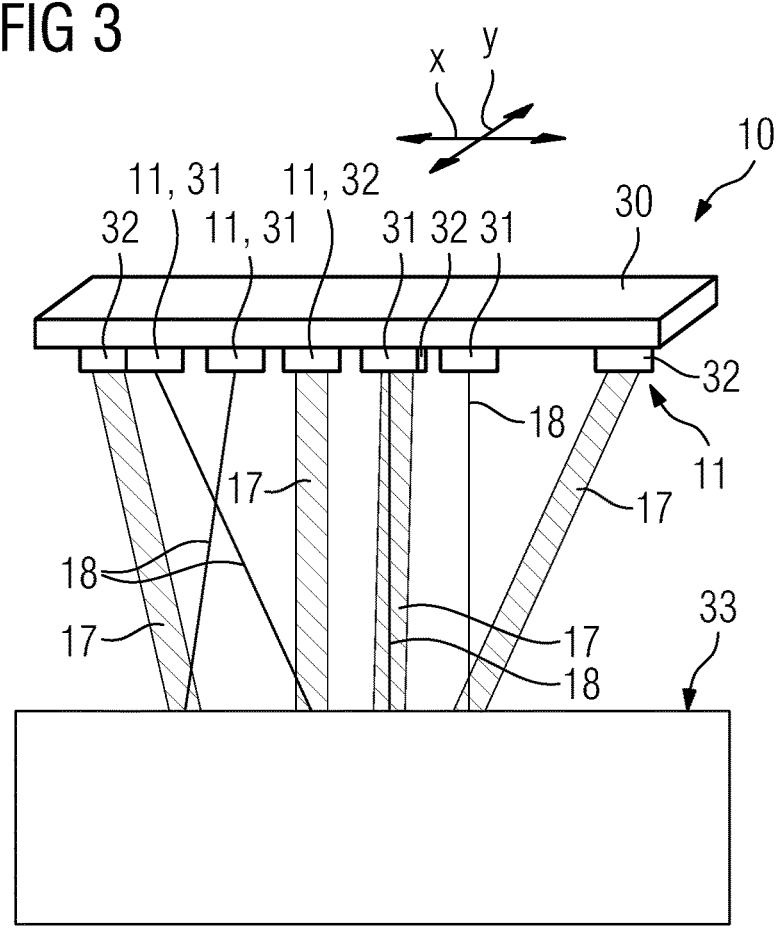
FIG. 3 is a schematic diagram of an apparatus for performing the method, comprising a plurality of beam sources for generating the main beam and the heating beam.

In the exemplary embodiment shown in FIG. 3, an irradiation device 10 comprising a plurality of beam sources or lasers 11 is provided. Main beams 18 are generated by a first group of lasers 31 arranged on a carrier 30, and a group of heating beams 17 are generated by a second group of lasers 32 also arranged on the carrier 30. Main and heating beams 18, 17 are exemplarily directed such that one heating beam 17 and one main beam 18, respectively, hit the construction material surface 33 arranged section-wise inside each other or closely adjacent to each other. The carrier 30 is attached to a compound rest assembly not explained in more detail, and is movable in X- and Y-directions above the construction material surface 33.

Figure 3A:
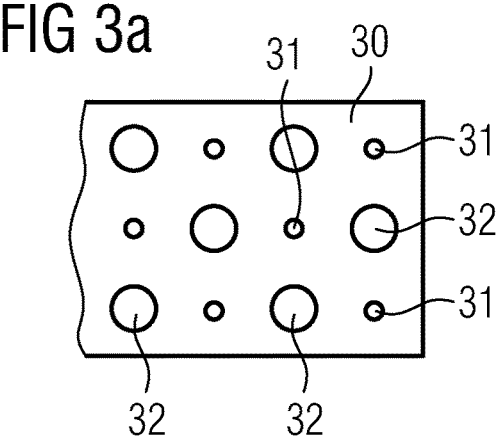
FIG. 3a is a schematic view of the beam sources arranged on a carrier.

FIG. 3a shows an exemplary arrangement of the lasers 31 associated with the first group and lasers 32 associated with the second group.

Figure 4:
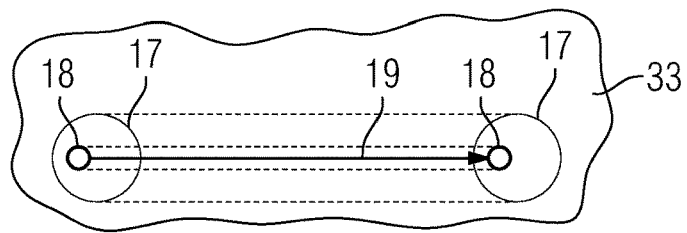
FIG. 4 is a schematic diagram of impact sections of the main and heating beams arranged inside each other, wherein the main beam is arranged decentralized in the impact area of the heating beam.

FIGS. 4-8 still show different impact points of the main and heating beams 18, 17 in top views analog to the FIGS. 1a, 1b. In FIG. 4, the heating beam 17 hits the construction material surface 33 circularly; the main beam 18 is arranged decentralized in the impact area of the heating beam 17 such that a larger section of the impact area of the heating beam 17 is going ahead the main beam 18 in track direction 19.

Figure 5:
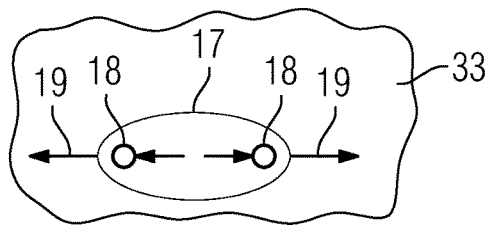
FIG. 5 is a schematic diagram of the impact sections of main beam and the heating beam, wherein the heating beam is falling onto the construction material surface in an elliptical area, and the heating beam is arranged in the respective end sections of the ellipse.

In FIG. 5, the impact area of the heating beam 17 is formed ellipsoidal. The impact area of the main beam 18 is either in a first end section or in an opposite second end section of the impact ellipse of the heating beam 17, depending on whether the track direction 19 is running to the right-hand side or the left-hand side in FIG. 5.

Figure 6:
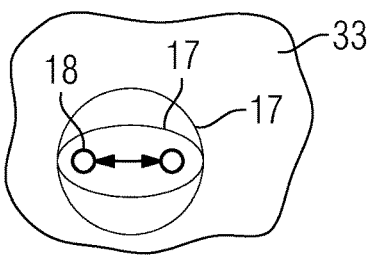
FIG. 6 is a schematic diagram of the impact sections of the main beam and the heating beam, wherein the shape of the heating beam in the section in which the beam hits the construction material surface can be changed.

FIG. 6 shows that the impact area of the heating beam 17 can (reversibly) be changed from a circularity to an ellipse in a process-controlled manner, and the impact point of the main beam 18 lying within the impact area of the heating beam 17 can (reversibly) be changed in its spatial position.

Figure 7:
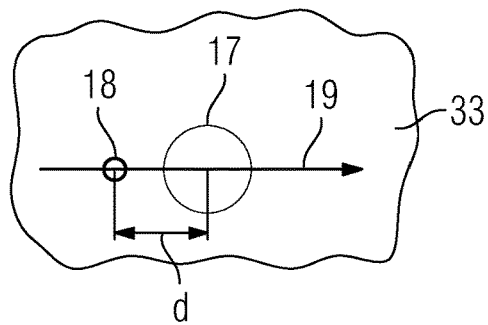
FIG. 7 is a schematic diagram of the impact sections of the main beam and the heating beam, wherein the heating beam is abutting going ahead the main beam.
Figure 8:
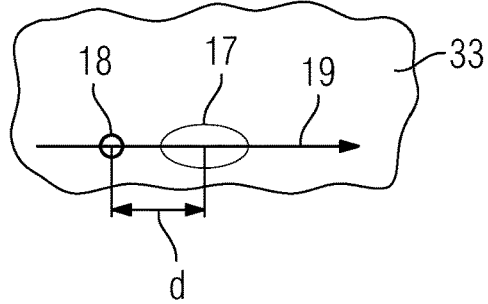
FIG. 8 is a diagram according to FIG. 7, wherein the heating beam is falling onto the construction material surface in an elliptical shape.

In FIGS. 7 and 8 it is shown that the main beam 18 can also hit adjacent to the heating beam 17, wherein the heating beam 17 in FIG. 7 is circular and the heating beam 17 in FIG. 8 has the shape of an approximated ellipse. The distance d between the main and heating beams 18, 17 can (reversibly) be varied in a process-controlled manner. It is essential that a guidance of the heating beam 17 is carried out that is running above the construction area together with the main beam 18.

The spot size of the heating beam 17 is, for example, selected larger than the one of the main beam 18. This ensures that only the direct surroundings of the main beam 18 are selectively heated at the time of solidification, i.e. especially melting or sintering, also referred to as "writing." The ratios of beam splitting as well as the spot sizes of the beams 17 and 18 can be varied during the process. A heating or preheating of the construction material 9 typically occurs only at the time of the actual solidification process, especially the melting process or sintering process, or shortly before that and essentially at the same place or near the solidification.

LIST OF REFERENCE NUMBERS

1 Apparatus
2 Housing
3 Construction room
4 Process chamber
5 Carrying device
6 Object
7 Carrier
8 Metering device
9 Construction material
10 Irradiation device
11 Laser
12 Scanner
15 Device
16 Beam coupling device
17 Heating beam
18 Main beam
19 Track direction

The invention claimed is:

1. A method for additive manufacturing of a three-dimensional object by successive, selective layer-by-layer solidification of layers of a construction material by at least one energy beam, wherein the successive, selective solidification of the construction material is carried out in accordance with a data record describing the three-dimensional object to be additively manufactured, the method comprising:
providing a plurality of construction material sections for sintering and/or melting on or melting through,
heating the plurality of construction material sections in a temperature range lying below the solidification temperature of the construction material, wherein the heating of the plurality of construction material sections is carried out by at least one heating beam, section-wise surrounding at least one main beam, provided for melting on or melting through,
guiding the main beam and the heating beam synchronously along a surface of the construction material,
extracting or splitting the heating beam from the main beam, and
varying a beam splitting ratio of the main beam and the heating beam and a spot size ratio of the main beam and the heating beam on the construction material surface during the selective layer-by-layer solidification of layers of the construction material.

2. The method according to claim 1, further comprising: coaxially guiding the heating beam to the main beam.

3. The method according to claim 2, further comprising: obtaining the heating beam from the main beam by beam extraction.

4. The method according to claim 1, further comprising: guiding the heating beam through a beam expansion optic after the heating beam diverges from the main beam.

5. The method according to claim 1, further comprising: reuniting the heating beam with the main beam in a beam coupling device.

6. The method according to claim 1, further comprising: guiding both the main beam and the heating beam over a scanner.

7. The method according to claim 1, further comprising: directing, to the construction material surface, the focus of the main beam, lying within an irradiation section of the heating beam.

8. The method according to claim 1, wherein an arrangement of the main beam and the heating beam inside each other is displaced or decentralized on the construction material surface in a process-controlled manner.

9. The method according to claim 1, wherein the surrounding area of the construction material surface covered by the heating beam is larger than the surface area on the construction material layer covered by the main beam.

10. The method according to claim 1, further comprising: selectively heating, with the heating beam, exclusively the direct surroundings of the main beam at the time of the solidification process.

11. The method according to claim 6, further comprising: generating the main beam with a first beam source, generating the heating beam with a second beam source different from the first beam source, and
bringing together the main beam and the heating beam in a beam coupling device prior to the main beam and the heating beam being delivered to the scanner.

12. The method according to claim 11, wherein the first beam source and the second beam source irradiate at different wavelengths.

13. An apparatus for additive manufacturing of a three-dimensional object by successive, selective layer-by-layer solidification of layers of a construction material by at least one energy beam, wherein the successive, selective solidification of the construction material is carried out in accordance with a data record describing the three-dimensional object to be additively manufactured, wherein construction material sections provided for sintering and/or melting on or melting through are heated in a temperature range lying below the solidification temperature of the construction material, the apparatus comprising:
- a housing,
- a process chamber accommodated in the housing,
- a construction room,
- a carrying device arranged in the construction room, the carrying device having a height adjustable carrier configured for carrying an object to be manufactured,
- an application device configured for applying layers of the construction material onto the carrying device or a layer previously formed,
- a metering device configured for delivering the construction material, and
- at least one irradiation device configured for irradiating layers of the construction material at the positions corresponding to the respective cross-section of the object, wherein in the housing a device for section-wise preheating of sections of the construction material layer is provided, wherein the device comprises at least one beam coupling device, with which a heating beam is configured for coupling with a main beam effecting a solidification process of the construction material such that both the heating beam and the main beam can together be guided over a plurality of construction material surface sections to be heated or to be solidified, wherein the focus of the main beam is arranged in that section in which the heating beam is delivered to the surface of the construction material, and wherein a beam splitting ratio of the main beam and the heating beam and a spot size ratio of the main beam and the heating beam on the construction material surface are varied during the selective layer-by-layer solidification of layers of the construction material.

14. The apparatus according to claim 13, wherein the heating beam is coaxially guided to the main beam.

15. The apparatus according to claim 14, wherein the heating beam is obtained from the main beam by beam extraction.

16. The apparatus according to claim 13, wherein the heating beam is guided through a beam expansion optic after the heating beam diverges from the main beam.

17. The apparatus according to claim 16, wherein the heating beam is reunited with the main beam in the beam coupling device.

18. The apparatus according to claim 13, wherein both the main beam and the heating beam are guided over a scanner.

19. The apparatus according to claim 18, wherein:
the main beam is generated with a first beam source,
the heating beam is generated with a second beam source different from the first beam source, and
the main beam and the heating beam are brought together in a beam coupling device prior to the main beam and the heating beam being delivered to the scanner.

20. The apparatus according to claim 13, wherein the focus of the main beam, lying within an irradiation section of the heating beam, is directed to the construction material surface.

* * * * *